United States Patent
Saito et al.

(10) Patent No.: US 10,703,306 B2
(45) Date of Patent: Jul. 7, 2020

(54) CIRCUIT FOR VEHICLE AND CIRCUIT ROUTING SYSTEM FOR VEHICLE

(71) Applicant: Yazaki Corporation, Tokyo (JP)

(72) Inventors: Yasuyuki Saito, Makinohara (JP);
Noriaki Sasaki, Makinohara (JP);
Yukinari Naganishi, Makinohara (JP);
Taku Furuta, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 77 days.

(21) Appl. No.: 16/050,164

(22) Filed: Jul. 31, 2018

(65) Prior Publication Data
US 2018/0334113 A1    Nov. 22, 2018

Related U.S. Application Data

(63) Continuation of application No. PCT/JP2017/003493, filed on Jan. 31, 2017.

(30) Foreign Application Priority Data

Feb. 2, 2016   (JP) .................................. 2016-018404

(51) Int. Cl.
  *B60L 1/00*    (2006.01)
  *B60L 3/00*    (2019.01)
  (Continued)

(52) U.S. Cl.
  CPC ............ *B60R 16/023* (2013.01); *B60R 16/02* (2013.01); *B60R 16/0207* (2013.01); *H02G 3/16* (2013.01); *H02G 3/00* (2013.01); *H02G 3/083* (2013.01)

(58) Field of Classification Search
  CPC ... B60R 16/023; B60R 16/0207; B60R 16/02; H02G 3/16; H02G 3/00; H02G 3/083
  See application file for complete search history.

(56) References Cited

U.S. PATENT DOCUMENTS 5,623,169 A    4/1997 Sugimoto et al.
5,818,673 A  * 10/1998 Matsumaru ............... H02J 1/06
                                                    361/63
(Continued)

FOREIGN PATENT DOCUMENTS

EP    0791506 A2    8/1997
JP    5-58230 A     3/1993
(Continued)

OTHER PUBLICATIONS

Search Report dated Apr. 25, 2017, issued by the International Searching Authority in counterpart International Patent Application No. PCT/JP2017/003493 (PCT/ISA/210).
(Continued)

*Primary Examiner* — Rexford N Barnie
*Assistant Examiner* — Rasem Mourad
(74) *Attorney, Agent, or Firm* — Sughrue Mion, PLLC

(57) ABSTRACT

This vehicle circuit routing system as a whole has a backbone-like routing structure, said system being provided with a plurality of backbone JB structures, wherein the vehicle circuit bodies of the backbone JB structures are connected to each other by means of a backbone main line. Each vehicle circuit body is provided with a power supply circuit that is connected to a main power supply on the vehicle, a plurality of connection parts to which a plurality of branch lines having a power supply line are connected, and a control unit that controls the distribution of power from the power supply circuit to the branch lines.

6 Claims, 12 Drawing Sheets

(51) Int. Cl.
  *H02G 3/00* (2006.01)
  *B60R 16/023* (2006.01)
  *B60R 16/02* (2006.01)
  *H02G 3/16* (2006.01)
  *H02G 3/08* (2006.01)

(56) References Cited

U.S. PATENT DOCUMENTS

| | | | |
|---|---|---|---|
| 7,393,218 B1* | 7/2008 | Pavlovic | H01R 4/646 439/939 |
| 2002/0019165 A1 | 2/2002 | Aoki et al. | |
| 2004/0230320 A1 | 11/2004 | Nagasawa et al. | |
| 2007/0274328 A1* | 11/2007 | Sonoda | H04B 3/36 370/401 |
| 2013/0285549 A1* | 10/2013 | Aoki | B60R 16/0207 315/79 |
| 2014/0103715 A1* | 4/2014 | Ito | B60R 16/0207 307/24 |
| 2015/0349471 A1* | 12/2015 | Maki | B60R 16/0215 307/10.1 |
| 2015/0360627 A1 | 12/2015 | Sasaki et al. | |
| 2015/0364618 A1 | 12/2015 | Iguchi | |

FOREIGN PATENT DOCUMENTS

| | | |
|---|---|---|
| JP | 9-325932 A | 12/1997 |
| JP | 2002-58151 A | 2/2002 |
| JP | 2003-175781 A | 6/2003 |
| JP | 2004-268630 A | 9/2004 |
| JP | 2005-78962 A | 3/2005 |
| JP | 2006-129615 A | 5/2006 |
| JP | 2006129615 A * | 5/2006 |
| JP | 2006-191727 A | 7/2006 |
| JP | 2015-227088 A | 12/2015 |
| JP | 2016-4687 A | 1/2016 |
| JP | 2016-4867 A | 1/2016 |
| JP | 2016-15809 A | 1/2016 |

OTHER PUBLICATIONS

Written Opinion dated Apr. 25, 2017, issued by the International Searching Authority in counterpart International Patent Application No. PCT/JP2017/003493 (PCT/ISA/237).

Communication dated Feb. 27, 2018, issued by the Japanese Patent Office in counterpart Japanese Patent Application No. 2016-018404.

English translation of Written Opinion dated Apr. 25, 2017, issued by the International Searching Authority in counterpart International Patent Application No. PCT/JP2017/003493 (PCT/ISA/237).

* cited by examiner

CIRCUIT FOR VEHICLE AND CIRCUIT ROUTING SYSTEM FOR VEHICLE

CROSS REFERENCE TO RELATED APPLICATIONS

This application is a continuation of PCT application No. PCT/JP2017/003493, which was filed on Jan. 31, 2017 based on Japanese patent application No. 2016-018404 filed on Feb. 2, 2016, whose contents are incorporated herein by reference. Also, all the references cited herein are incorporated as a whole.

BACKGROUND OF THE INVENTION

1. Technical Field

The present invention relates to a circuit for a vehicle and a circuit routing system for the vehicle, that are routed on the vehicle.

2. Background Art

On a vehicle, power supply power has to be suitably fed, for example, from an alternator (power generator) or a battery that is a main power supply to each of a huge number of various electrical components. In addition, such a system used for feeding the power supply power also has to be provided with a function of switching ON/OFF the feeding of the power in accordance with necessity or a function for cutting off a current for each electric circuit when an overcurrent flows into any electrical component.

In a general vehicle, a wire harness serving as an assembly of a large number of electric wires is routed on the vehicle so that a main power supply is connected with electrical components of respective portions through the wire harness to thereby feed power to the electrical components of the respective portions. In addition, it is general that a junction block is used for distributing the power of the power supply to a plurality of electric circuits, a relay box is used for controlling ON/OFF of the feeding of the power in accordance with each of the electric circuits, or a fuse box is used for protecting each of the electric wires or a load of the wire harness.

A wire harness shown in JP-A-2005-78962 is provided with a network transmission path, and a circuit for feeding power, GND, or another signal. In addition, the wire harness is provided with a wire harness trunk line, a sub wire harness, an optional sub wire harness, and a network hub device.

SUMMARY

Recently, the structure of the wire harness routed on a body of a vehicle tends to be complicated with an increase of the number of electrical components mounted on the vehicle. Accordingly, the wire harness trunk line, the sub wire harness, and the optional sub wire harness are combined to configure the wire harness having a complicated shape as a whole, as in JP-A-2005-78962. Thus, the wire harness can be connected with various electrical components disposed at various places on the vehicle body.

In addition, with the increase of the number of the electrical components mounted on the vehicle, the diameter of each of the electric wires constituting the wire harness increases or the number of the electric wires increases. Accordingly, the size of the wire harness as a whole tends to increase, or the weight thereof tends to increase. In addition, with a variation of types of vehicles mounted with wire harnesses or an increase in the number of kinds of optional electrical components mounted on the vehicles, the number of kinds and item numbers of the wire harnesses to be manufactured increase. Therefore, it is difficult to commonize components constituting the wire harnesses to thereby result in an increase of the component cost or manufacturing cost.

In addition, in order to finish a wire harness with a predetermined routing shape in a work process of manufacturing the wire harness, a bundle of a large number of electric wires constituting the wire harness is routed for a long distance to extend along a preliminarily designated path. Thus, it takes long work time therefor. In addition, substantially all the electric wires are gathered in a trunk line portion of the wire harness. Accordingly, the number of the bundled electric wires is so large that the weight increases.

In addition, when, for example, a new electrical component that was not assumed in original design is mounted on the vehicle, a path for transmitting a special signal between the electrical component and another electrical component has to be secured, or a new electric wire has to be added to the wire harness in order to feed power supply power. However, the structure or shape of the wire harness is complicated, and it is very difficult to add another electric wire to the existing wire harness afterwards. Accordingly, it is necessary to design a new wire harness different in kind or item number and manufacture the new wire harness as another product.

The present invention has been accomplished in consideration of the aforementioned circumstances. An object of the present invention is to provide a circuit for a vehicle and a circuit routing system for the vehicle, in which a structure for electric connection between various electrical components and a power supply on the vehicle and among the electrical components, particularly the configuration of a trunk line portion, is simplified and addition of a new electric wire is also easy.

In order to attain the aforementioned object, the circuit for the vehicle and the circuit routing system for the vehicle according to the present invention are characterized by the following configurations (1) to (6).
(1) A circuit for a vehicle, that is placed on the vehicle, the circuit including:
   a power supply circuit that is connected to a main power supply on the vehicle;
   a plurality of connection portions to which a plurality of branch lines having power supply lines are connected respectively; and
   a control portion that controls distribution of power from the power supply circuit to the plurality of branch lines.
(2) A circuit for a vehicle according to the aforementioned configuration (1), wherein:
   each of the branch lines includes a communication line; and
   the circuit for the vehicle further includes:
   a communication circuit that connects, of the branch lines connected to the connection portions, the communication lines to one another in a communicable state.
(3) A circuit for a vehicle according to the aforementioned configuration (1), further including:
   a plurality of fuses that can cut off feeding of power from the power supply circuit to the plurality of branch lines respectively.
(4) A circuit for a vehicle according to the aforementioned configuration (1), further including:

a trunk line connection portion that serves for connecting a belt-like trunk line connected to the main power supply to the power supply circuit.

(5) A circuit for a vehicle according to the aforementioned configuration (1), further including:

a ground busbar in which a plurality of protrusion portions to which predetermined ground terminals can be connected are formed at fixed intervals along a direction in which the plurality of connection portions are arranged side by side.

(6) A circuit routing system for a vehicle, including:

a plurality of circuits for the vehicle according to any one of the aforementioned configurations (1) to (5); wherein:

the plurality of circuits for the vehicle are connected to one another through a shared trunk line.

According to the circuit for the vehicle having the aforementioned configuration (1), various electrical components (accessories of the vehicle) can be connected to the connection portions via the branch lines. Accordingly, power supply power can be fed from the main power supply on the vehicle to each of the electrical components. In addition, the circuit for the vehicle is provided with the plurality of connection portions. Accordingly, connection positions of the branch lines or the number of the connected branch lines can be changed in accordance with necessity.

According to the circuit for the vehicle having the aforementioned configuration (2), power supply power feeding paths and communication paths of the electrical components to be connected can be secured. Accordingly, various kinds of electrical components can be connected via the branch lines.

According to the circuit for the vehicle having the aforementioned configuration (3), the plurality of fuses for cutting off the feeding of power to the branch lines against an overcurrent can be concentratedly disposed at one place. Accordingly, management or maintenance of the fuses is easy. In addition, it is unnecessary to connect the fuses to the branch lines or the respective electrical components. Accordingly, the structure of a wire harness as a whole can be simplified.

According to the circuit for the vehicle having the aforementioned configuration (4), the circuit for the vehicle can be connected to the main power supply via the belt-like trunk line so that an input path of the power supply power can be secured. In the case where the belt-like trunk line is used, the belt-like trunk line can be easily bent in the thickness direction even when the sectional area of the trunk line is large. Therefore, work for routing the trunk line along a desired routing path on the vehicle is easy.

According to the circuit for the vehicle having the aforementioned configuration (5), when one of the branch lines is connected to one of the connection portions, a ground terminal can be connected to one of the plurality of protrusion portions located in the vicinity of the connection portion. When the shape or dimensions of the plurality of protrusion portions are commonized, the degree of freedom for selecting one of the protrusion portions as a connection destination is increased.

According to the circuit routing system for the vehicle having the aforementioned configuration (6), the electrical components disposed at various places can be connected through the branch lines with comparatively short lengths by use of the circuits for the vehicle connected respectively to a plurality of portions of the shared trunk line. The routing shape of the system as a whole can be also easily changed.

According to the circuit for the vehicle and the circuit routing system for the vehicle according to the present invention, a structure for electric connection between various electrical components and a power supply on a vehicle and among the electrical components, particularly the configuration of a trunk line portion, can be simplified and addition of a new electric wire is also easy.

DETAILED DESCRIPTION OF EMBODIMENTS

A specific embodiment about the present invention will be described below with reference to the respective drawings.

First, an outline of a circuit routing system for a vehicle will be described.

Figure 1:
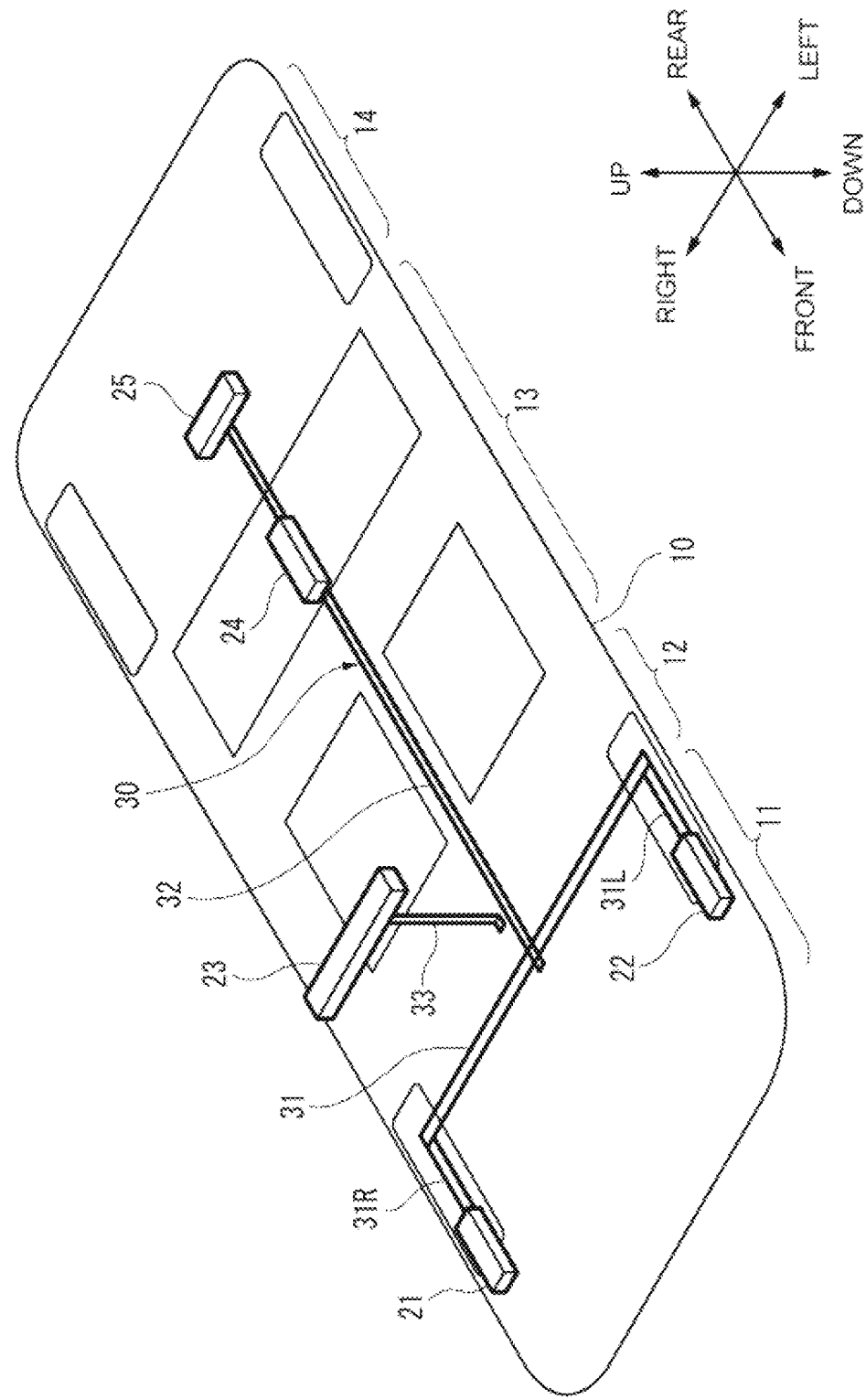
FIG. 1 is a perspective view showing a layout of a circuit routing system for a vehicle on a vehicle body in an embodiment of the present invention.
Figure 2:
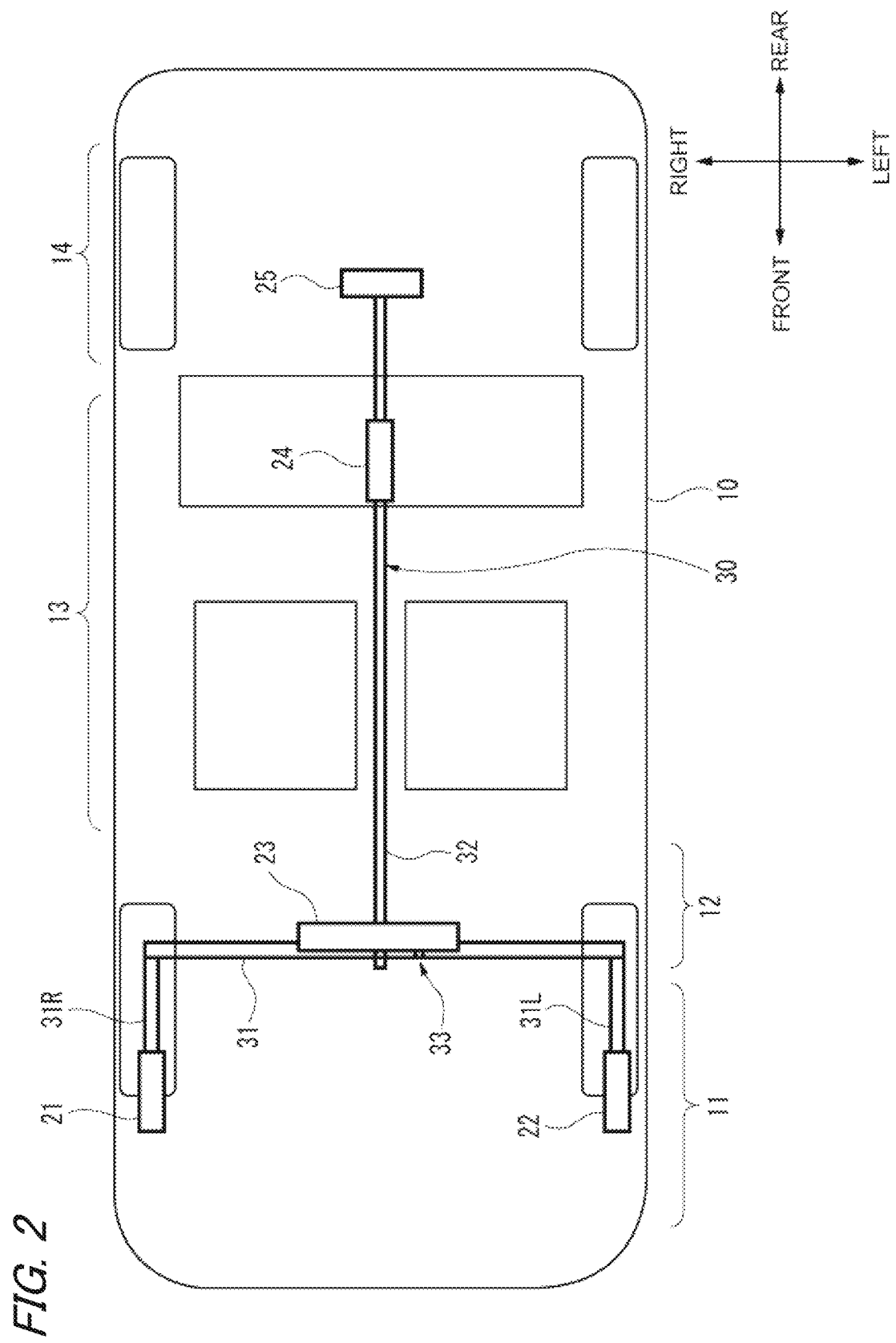
FIG. 2 is a plan view showing the layout of the same circuit routing system for the vehicle as that in FIG. 1 on the vehicle body.

A layout of the circuit routing system for the vehicle on a vehicle body in the embodiment of the present invention is shown in FIG. 1 and FIG. 2.

The circuit routing system for the vehicle is used as a transmission line required for feeding power of a main power supply such as an on-vehicle battery respectively to accessories i.e. various electrical components at respective portions of the vehicle body or for performing exchange of signals among the electrical components. That is, the circuit routing system for the vehicle is similar to or the same as a general wire harness in function but largely different from the general wire harness in structure.

The circuit routing system for the vehicle shown in FIG. 1 and FIG. 2 is provided with a plurality of backbone JB (Junction Block) structure bodies 21 to 25 that are placed at different places from one another, and a backbone trunk line portion 30 that connects the backbone JB structure bodies 21 to 25 to one another. Each of electrical components that is placed at each of the portions of the vehicle body is connected to the system through a branch line sub harness (that will be described later in detail) connected to one of the backbone JB structure bodies 21 to 25. That is, various transmission lines can be routed with a structure like a spine (backbone) on the vehicle body.

In the embodiment, the backbone trunk line portion 30 is provided with a front routing portion 31, a front/rear direction routing portion 32, and a rising routing portion 33. The front routing portion 31 is disposed to extend in a left/right direction inside an engine room 11 located on a front side of a vehicle body 10. The front/rear direction routing portion 32 is disposed on a floor of the vehicle body 10, and disposed to extend in the front/rear direction from the engine room 11 to a luggage compartment 14. A front end portion of the front/rear direction routing portion 32 is connected to the front routing portion 31. The rising routing portion 33 is disposed at an instrument panel portion 12 of the vehicle body 10 and extends upward from the front/rear direction routing portion 32 so that an upper end of the rising routing portion 33 is disposed in the vicinity of the instrument panel. A lower end of the rising routing portion 33 is connected to the front/rear direction routing portion 32.

Each of the front routing portion 31, the front/rear direction routing portion 32, and the rising routing portion 33 included in the backbone trunk line portion 30 is formed into a long and narrow belt shape. Specifically, each of the front routing portion 31, the front/rear direction routing portion 32, and the rising routing portion 33 is formed as a laminate in which a power supply busbar made of metal (such as aluminum or copper) shaped like a thin plate with excellent electric conductivity and a ground busbar are laminated on each other in their thickness direction with interposition of an insulator therebetween. In addition, a communication cable is also included in the backbone trunk line portion 30. In this case, when the power supply busbar, the ground busbar and the communication cable are assembled into a three-layer structure, the backbone trunk line portion 30 can be made to have a thinner and simpler configuration.

The backbone trunk line portion 30 is formed out of the metal having the belt shape. Accordingly, even when the sectional area of the backbone trunk line portion 30 is large, the backbone trunk line portion 30 can be bent easily in the thickness direction, and routed easily in line with a surface shape of each of the portions of the vehicle body 10. In addition, the surface area of the backbone trunk line portion 30 is large to be advantageous in view of heat radiation. Accordingly, a large current can be allowed to pass through the backbone trunk line portion 30.

In the example shown in FIG. 1 and FIG. 2, the backbone JB structure body 21 is disposed on a right side of the engine room 11 and connected to a right end 31R of the front routing portion 31. The backbone JB structure body 22 is disposed on a left side of the engine room 11 and connected to a left end 31L of the front routing portion 31.

In addition, the backbone JB structure body 23 is disposed inside the instrument panel of the vehicle body 10 and connected to the upper end of the rising routing portion 33. In addition, the backbone JB structure body 24 is disposed in the vicinity of the center of the floor portion 13 inside a cabin of the vehicle body 10. The backbone JB structure body 25 is disposed in the vicinity of the center of the luggage compartment 14 of the vehicle body 10. Both the backbone JB structure bodies 24 and 25 are connected to the backbone trunk line portion 30.

Next, the configuration of one of the backbone JB structure bodies will be described.

Figure 3:
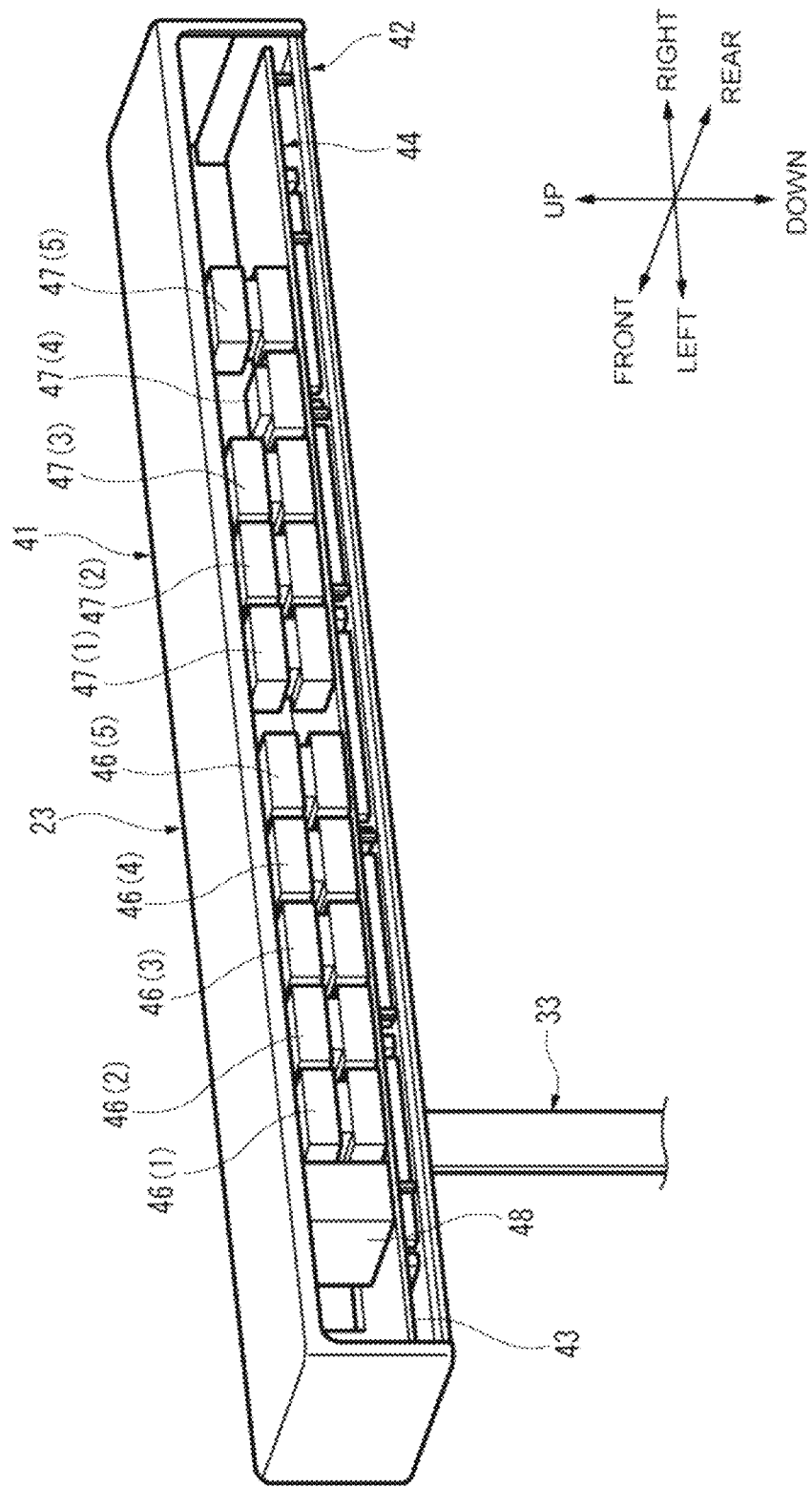
FIG. 3 is a perspective view showing external appearance of one backbone JB structure body included in the circuit routing system for the vehicle in the embodiment of the present invention.
Figure 4:
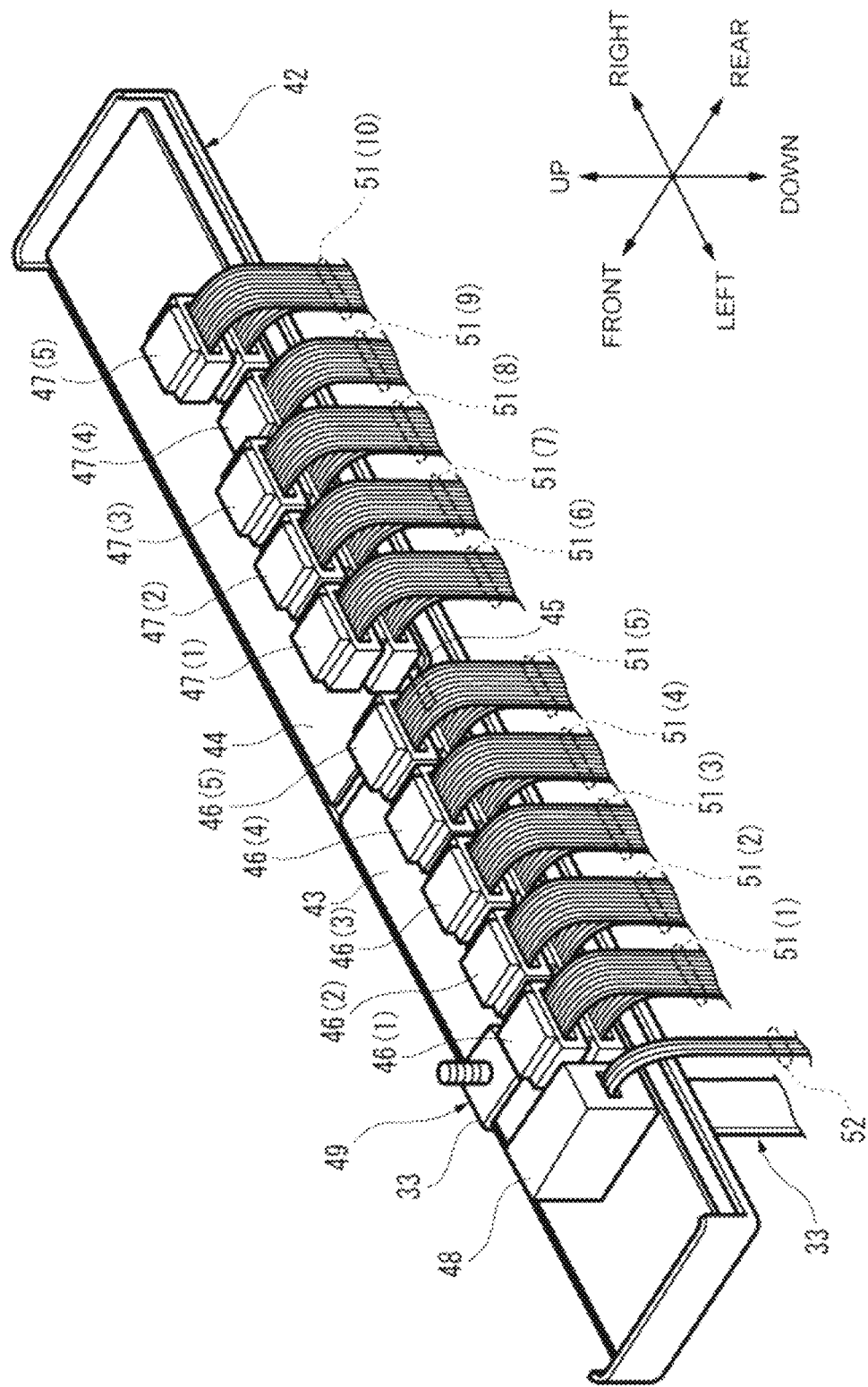
FIG. 4 is a perspective view showing a state in which an upper cover has been removed from the backbone JB structure body of FIG. 3.
Figure 5:
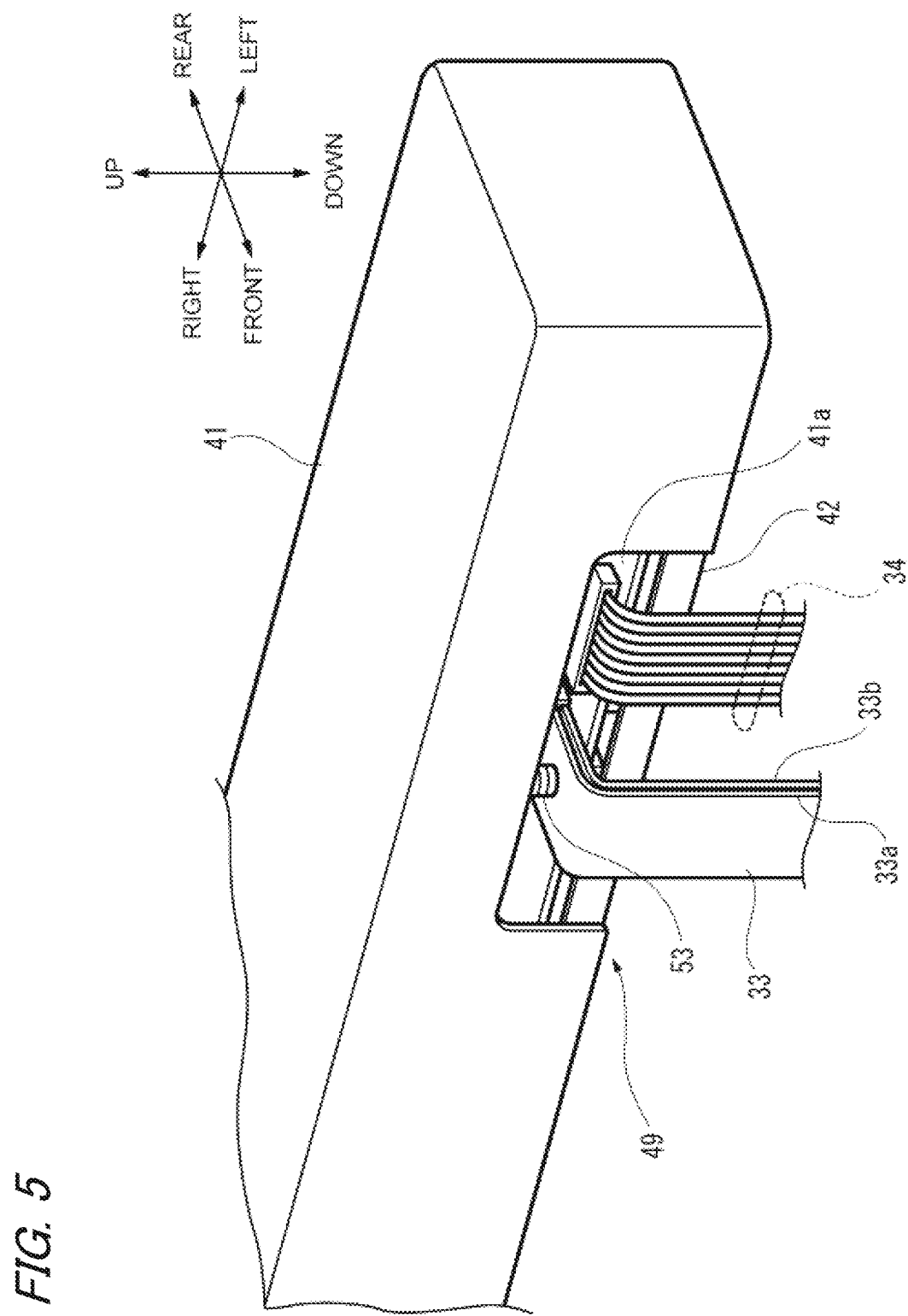
FIG. 5 is a perspective view showing the vicinity of a trunk line connection portion of the backbone JB structure body shown in FIG. 3.
Figure 6:
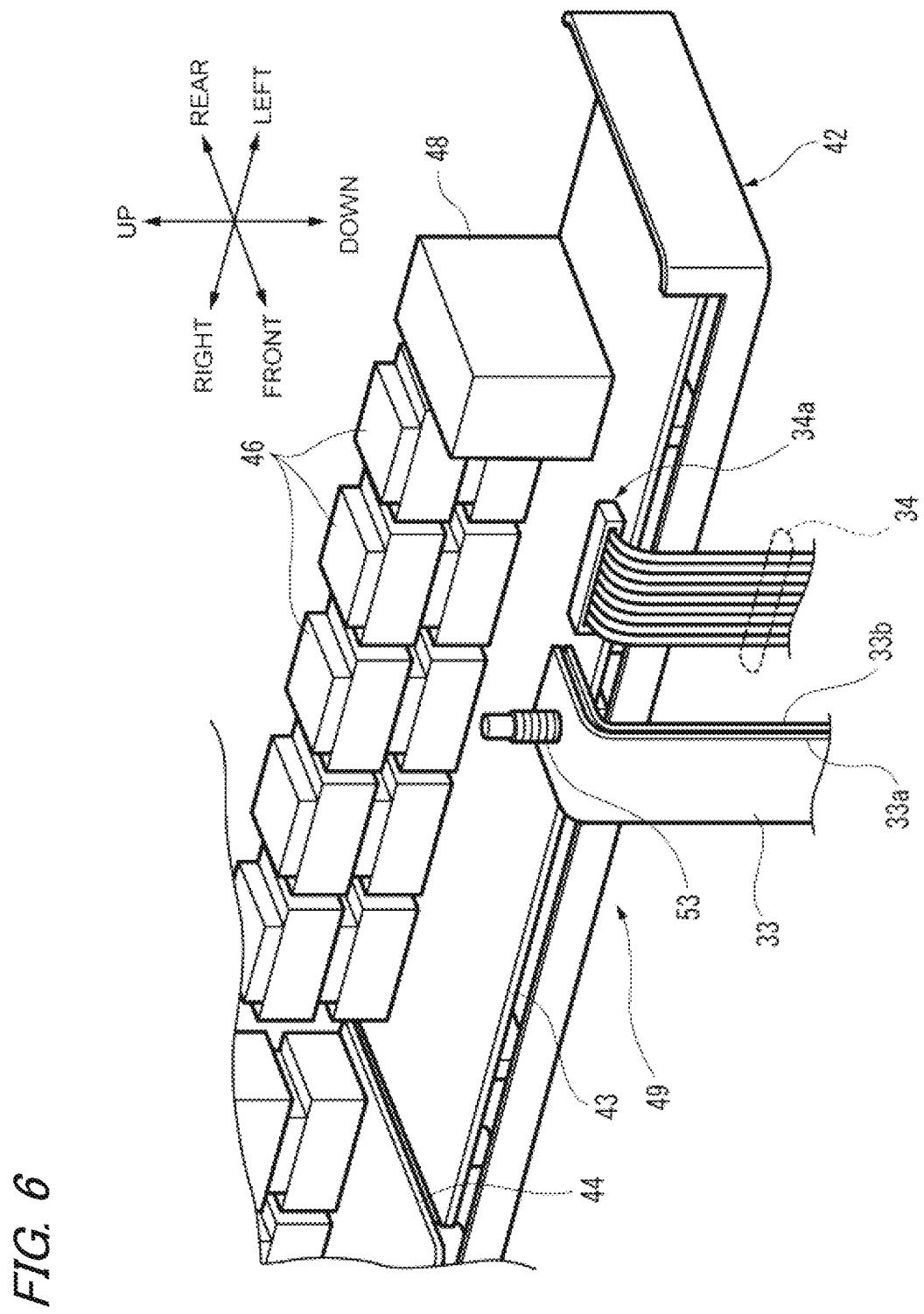
FIG. 6 is a perspective view showing a state in which the upper cover has been removed from the backbone JB structure body of FIG. 5.

External appearance of the backbone JB structure body 23 included in the circuit routing system for the vehicle shown in FIG. 1 and FIG. 2 is shown in FIG. 3. In addition, a state in which an upper cover 41 has been removed from the backbone JB structure body of FIG. 3 is shown in FIG. 4. In addition, the vicinity of a trunk line connection portion 49 of the backbone JB structure body 23 shown in FIG. 3 is shown in FIG. 5. A state in which the upper cover 41 has been removed from the backbone JB structure body 23 of FIG. 5 is shown in FIG. 6.

Incidentally, each of the backbone JB structure bodies 21, 22, 24, and 25 shown in FIG. 1 and FIG. 2 is similar to or the same as the backbone JB structure body 23 of FIGS. 3 to 6 in basic structure but respectively slightly different from the backbone JB structure body 23 of FIGS. 3 to 6 in specifications such as the number of components, the attachment position, the shape, and the dimensions.

As shown in FIG. 3, a casing of the backbone JB structure body 23 has a box-like shape long and narrow in the left/right direction. The upper-side upper cover 41 and a lower-side lower cover 42 are fitted integrally with each other to form the casing of the backbone JB structure body 23. The upper cover 41 and the lower cover 42 are formed, for example, out of a hard resin that is an electrical insulator.

A front side (the rear direction of the vehicle body) of the casing is opened so that connection of a large number of branch line sub harnesses 51(1) to 51(10) shown in FIG. 4 or a communication sub harness 52 can be made. A large number of branch line connection connectors 46(1) to 46(5) and 47(1) to 47(5) are disposed at places facing the opening portion.

As shown in FIG. 4, two printed circuit boards 43 and 44 are disposed side by side in an adjacent state in the longitudinal direction inside the lower cover 42. Each of the printed circuit boards 43 and 44 is disposed in a slightly floated state from a lower surface of the lower cover 42 due to a predetermined spacer and in parallel with the lower surface, and fixed to the lower cover 42 by screws at several places.

Each of the printed circuit boards 43 and 44 is a double-sided circuit board in which a predetermined circuit pattern is formed out of copper foil on each of upper and lower surfaces. The upper-side surface circuit pattern is mainly used for connection of a power supply line, and the lower-side surface circuit pattern is mainly used for connection of a ground line. In the example shown in FIG. 4, the circuit of the printed circuit board 43 and the circuit of the printed circuit board 44 are linked to each other through a busbar 45. Incidentally, the two printed circuit boards 43 and 44 may be collectively replaced by one printed circuit board.

As shown in FIG. 4, the five branch line connection connectors 46(1) to 46(5) are disposed side by side in one row in the longitudinal direction on the printed circuit board 43. In addition, a control unit 48 is disposed on the printed circuit board 43. In addition, the five branch line connection connectors 47(1) to 47(5) are also disposed side by side in one row in the longitudinal direction on the printed circuit board 44.

Connectors of end portions of the connectable branch line sub harnesses 51(1) to 51(10) can be detachably connected to the branch line connection connectors 46(1) to 46(5) on the printed circuit board 43 and the branch line connection connectors 47(1) to 47(5) on the printed circuit board 44, as shown in FIG. 4.

Each of various accessories, i.e. electrical components, mounted on the vehicle can be connected to the backbone JB structure body 23, for example, through one of the branch line sub harnesses 51(1) to 51(10). Each of the branch line sub harnesses 51(1) to 51(10) is constituted by a plurality of electric wires. A power supply line, a ground line, and a communication line are included in these electric wires.

The control unit 48 on the printed circuit board 43 has a built-in microcomputer operating in accordance with its own preinstalled program. The microcomputer controls distribution of power to be fed to each of the branch line connection connectors 46(1) to 46(5) and 47(1) to 47(5) in accordance with its own control algorithm or in accordance with an instruction from a superordinate electronic control unit (ECU) mounted on the vehicle. In addition, the control unit 48 is provided with a data communication function for making communication with the superordinate electronic control unit so that the control unit 48 can make communication through the communication sub harness 52.

On the other hand, as shown in FIGS. 4 to 6, the trunk line connection portion 49 is provided on a back surface side (a surface located in the front direction of the vehicle body) of the backbone JB structure body 23. That is, the rising routing portion 33 of the backbone trunk line portion 30 and a communication sub harness 34 can be connected to the printed circuit board 43 through an opening portion 41*a* formed in the upper cover 41.

As shown in FIG. 5 and FIG. 6, the rising routing portion 33 is provided with a power supply busbar 33*a* and a ground busbar 33*b* that are laminated on each other in the thickness direction. The rising routing portion 33 rises up in a direction from down to up, and is then bent substantially by 90 degrees in the thickness direction at the place of the trunk line connection portion 49 of the backbone JB structure body 23 so that a front end portion of the rising routing portion 33 faces in a lateral direction. The front end portion is connected to the printed circuit board 43.

More specifically, the upper-side power supply busbar 33*a* and the lower-side ground busbar 33*b* are separated from each other at the front end portion. A front end of the power supply busbar 33*a* is pressed against the circuit pattern of the supply power on the upper surface side of the printed circuit board 43 from above. A frond end of the ground busbar 33*b* is pressed against the circuit pattern of the ground on the lower surface side of the printed circuit board 43 from below so as to be fixed. In order to fix the front end portion of the rising routing portion 33 to the printed circuit board 43, an insulating type bolt 53 is disposed to penetrate the printed circuit board 43, and the bolt is then screwed into a not-shown nut so as to be fastened thereby. For example, an outer circumference of a portion of the insulating type bolt 53 in contact with the printed circuit board 43 is covered with an insulating coating film so that the upper surface side and the lower surface side can be prevented from short-circuiting.

The communication sub harness 34 is a belt-like cable in which a large number of communication lines disposed side by side in one row in a width direction of the cable are integrated with one another. The communication sub harness 34 is constituted by a flat cable (FC), a flexible flat cable (FFC), or a flexible printed circuit (FPC). The communication sub harness 34 is connected to the printed circuit board 43 in a detachable state by a connector 34*a* provided at a front end of the communication sub harness 34.

Accordingly, each electrical component connected to each branch line connection connector 46, 47 of the backbone JB structure body 23 through the branch line sub harness 51 can make communication with any of other various electrical components connected to the backbone trunk line portion 30 via the backbone JB structure body 23 and one of the communication lines on the communication sub harness 34.

Next, a basic line connection state of an on-vehicle system will be described.

Figure 7:
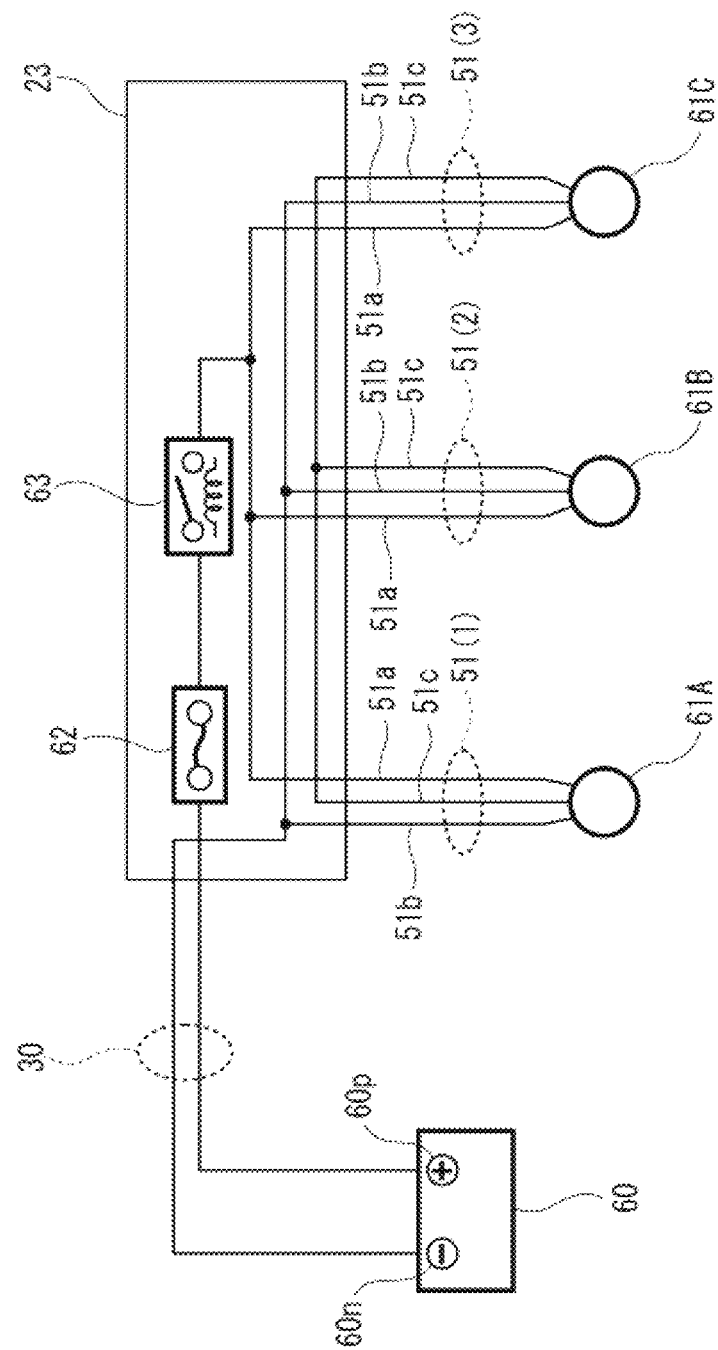
FIG. 7 is a line connection diagram showing a basic line connection state of an on-vehicle system including one backbone JB structure body.

An example of a basic line connection state of an on-vehicle system including one backbone JB structure body 23 is shown in FIG. 7. Incidentally, illustration of constituent elements except some required for description is omitted from FIG. 7.

In the example shown in FIG. 7, an on-vehicle battery 60 that is a main power supply of a vehicle is connected to an upstream side of the backbone JB structure body 23 via a backbone trunk line portion 30. A power supply busbar and a ground busbar are included in the backbone trunk line portion 30, as described above. Accordingly, the power supply busbar of the backbone trunk line portion 30 is connected to a positive electrode terminal 60*p*, and the ground busbar of the backbone trunk line portion 30 is connected to a negative electrode terminal 60*n*.

In the example shown in FIG. 7, electrical components 61A, 61B and 61C are connected to three branch line connection connectors of the backbone JB structure body 23 via branch line sub harnesses 51(1), 51(2) and 51(3), respectively.

Ground terminals of the respective electrical components 61A, 61B and 61C are connected to the negative electrode terminal 60*n* of the on-vehicle battery 60 via ground lines 51*b* of the respective branch line sub harnesses 51(1), 51(2) and 51(3), the backbone JB structure body 23 and the backbone trunk line portion 30.

In addition, power supply power fed from the positive electrode terminal 60*p* of the on-vehicle battery 60 passes through the backbone trunk line portion 30, passes through a fuse 62 and a relay 63 inside the backbone JB structure body 23, passes through power supply lines 51*a* of the branch line sub harnesses 51(1), 51(2) and 51(3), and is then fed to the respective electrical components 61A, 61B and 61C. Accordingly, presence/absence of the feeding of the power to each of the electrical components 61A, 61B and 610 can be controlled by operations of the fuse 62 and the relay 63. In addition, only the fuse 62 and the relay 63 that cut off the path shared by all the electrical components 61A, 61B and 61C are shown in the example shown in FIG. 7. However, in a practical backbone JB structure body 23, independent fuses and relays arranged respectively for electric circuits of branch line connection connectors 46 are also provided so that the electrical components 61A, 61B and 61C can be controlled individually and respectively.

In addition, a communication line 51*c* of the branch line sub harness 51(1), a communication line 51*c* of the branch line sub harness 51(2) and a communication line 51*c* of the branch line sub harness 51(3) are connected to one another inside the backbone JB structure body 23. Accordingly, the electrical components 61A, 61B and 61C can make communication with one another through a path via the branch line sub harnesses 51(1) to 51(3) and the backbone JB structure body 23. Practically, a communication path inside the backbone JB structure body 23 is connected to the backbone trunk line portion 30 via the aforementioned communication sub harness 34. Accordingly, the electrical components 61A, 61B and 61C can make communication with other various electrical components connected to the backbone trunk line portion 30.

Next, a connection state between an internal configuration of a backbone JB structure body and an external circuit will be described.

Figure 8:
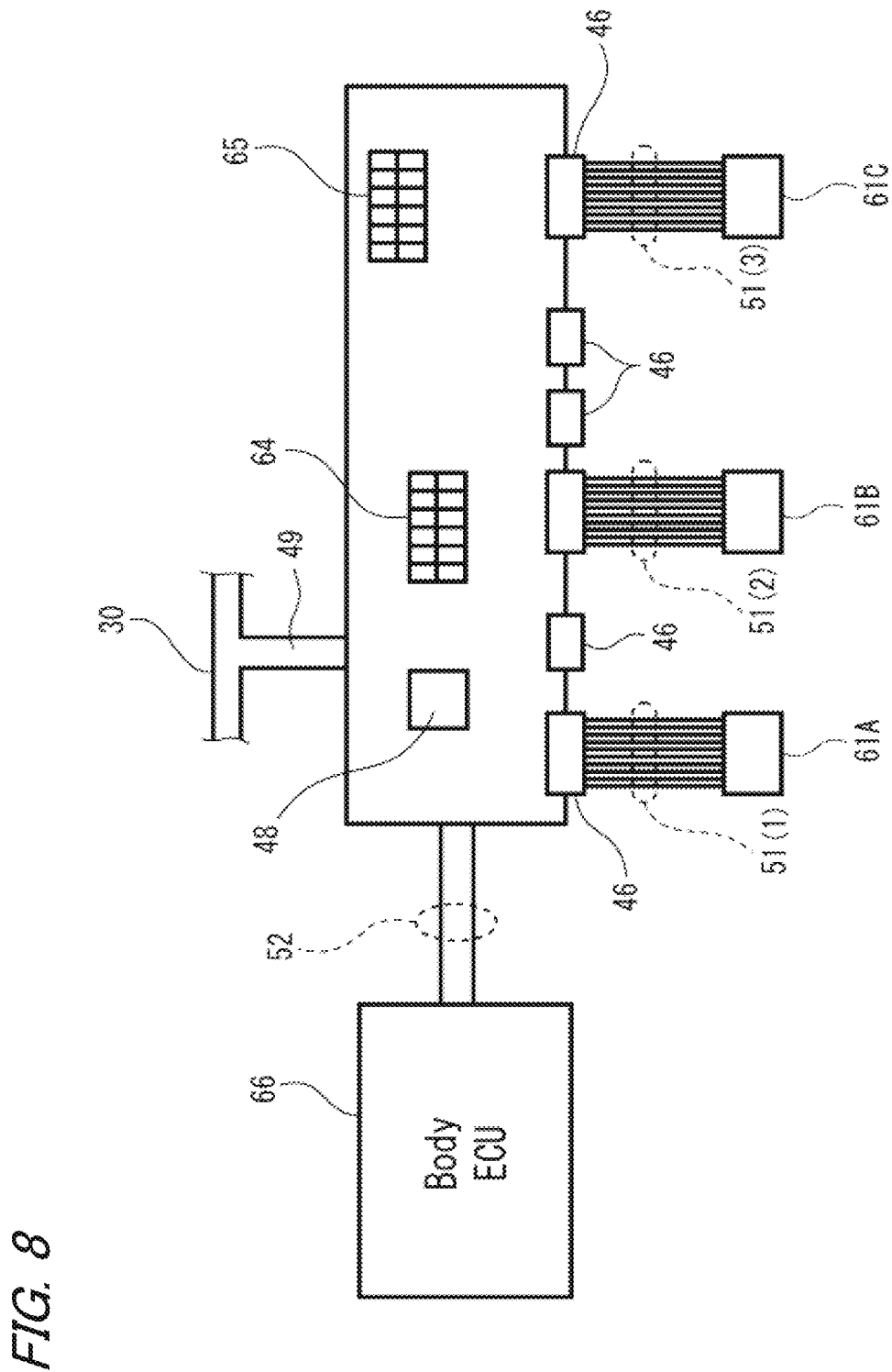
FIG. 8 is a block diagram showing an example of a connection state between an internal configuration of one backbone JB structure body and an external circuit.

An example of a connection state between an internal configuration of one backbone JB structure body 23 and an external circuit is shown in FIG. 8.

In the configuration shown in FIG. 8, electrical components 61A, 61B and 61C are connected to a plurality of branch line connection connectors 46 of the backbone JB structure body 23 via branch line sub harnesses 51(1), 51(2) and 51(3), respectively. In addition, an upstream side of the backbone JB structure body 23 is connected to a backbone trunk line portion 30 at a trunk line connection portion 49. In addition, a control unit 48 inside the backbone JB structure body 23 is connected to a body ECU 66 of a vehicle via a communication sub harness 52.

As shown in FIG. 8, a fuse group 64 and a relay group 65 are built in the inside of the backbone JB structure body 23. The fuse group 64 includes a plurality of fuses provided individually and respectively for electric circuits of the branch line connection connectors 46 in addition to the fuse 62 shown in FIG. 7. In addition, the relay group 65 also includes a plurality of relays provided individually and respectively for the electric circuits of the branch line connection connectors 46 in addition to the relay 63 shown in FIG. 7.

The plurality of fuses in the fuse group 64 are disposed in a state in which the fuses are put together at one place inside the backbone JB structure body 23. Similarly, the plurality of relays in the relay group 65 are also disposed in a state in which the relays are put together at one place inside the backbone JB structure body 23. Since the fuses and the relays are disposed to be put together in this manner, maintenance such as inspection or component replacement is easy.

The control unit 48 individually controls ON/OFF of the relays of the respective electric circuits included in the relay group 65 in accordance with its own control algorithm or in accordance with an instruction from the superordinate body ECU 66. Thus, the control unit 48 can adjust distribution of power supply power to be fed from the branch line connection connectors 46 to the respective electrical components 61A, 61B and 61C. When, for example, there is a small margin of power accumulated in an on-vehicle battery 60 that is a main power supply, the control unit 48 can make control to suspend the feeding of the power to any electrical component low in priority but distribute the power supply power only to any electrical component high in priority.

(Modification)

Figure 9:
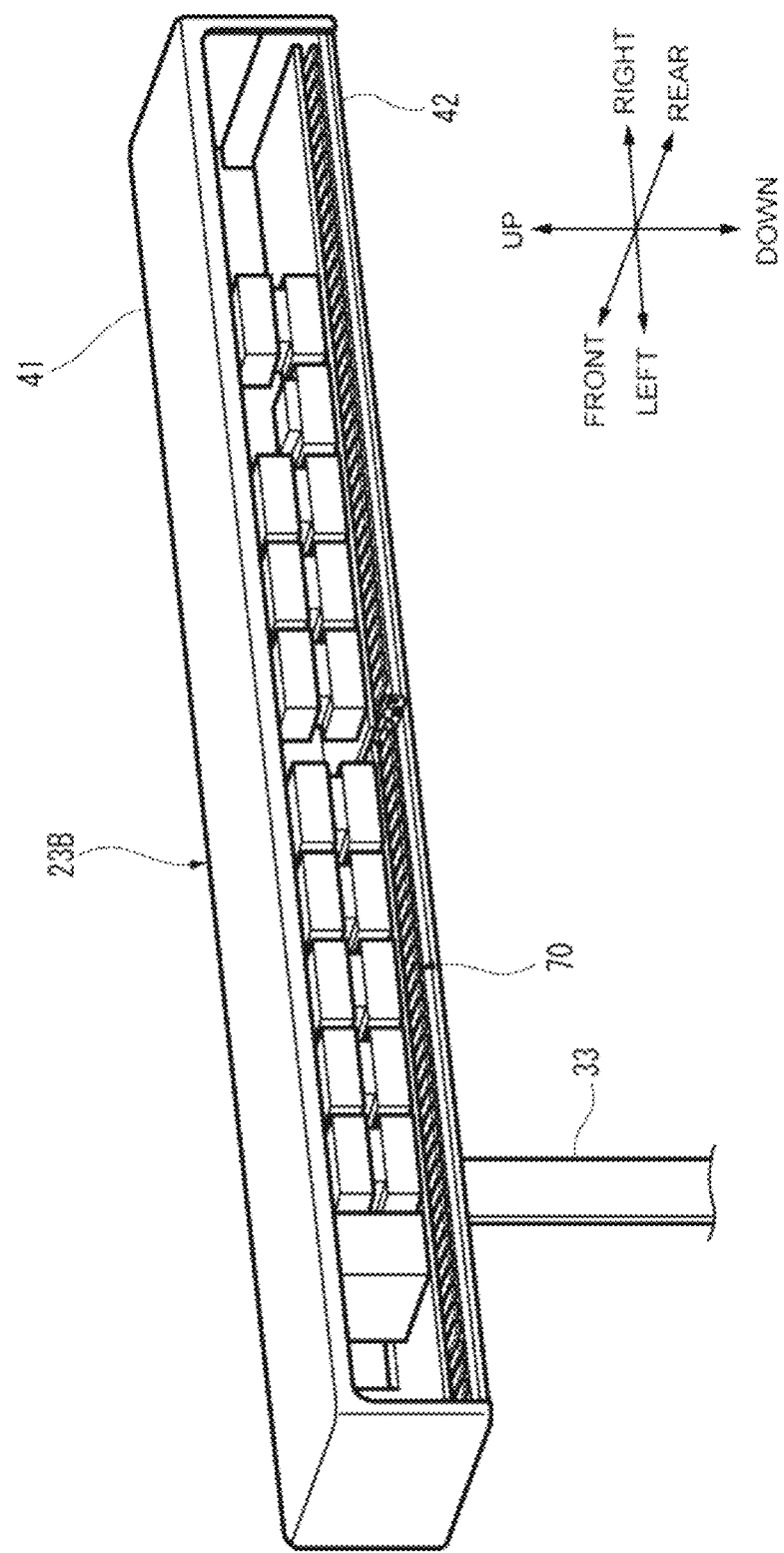
FIG. 9 is a perspective view showing external appearance of a backbone JB structure body according to a modification.
Figure 10:
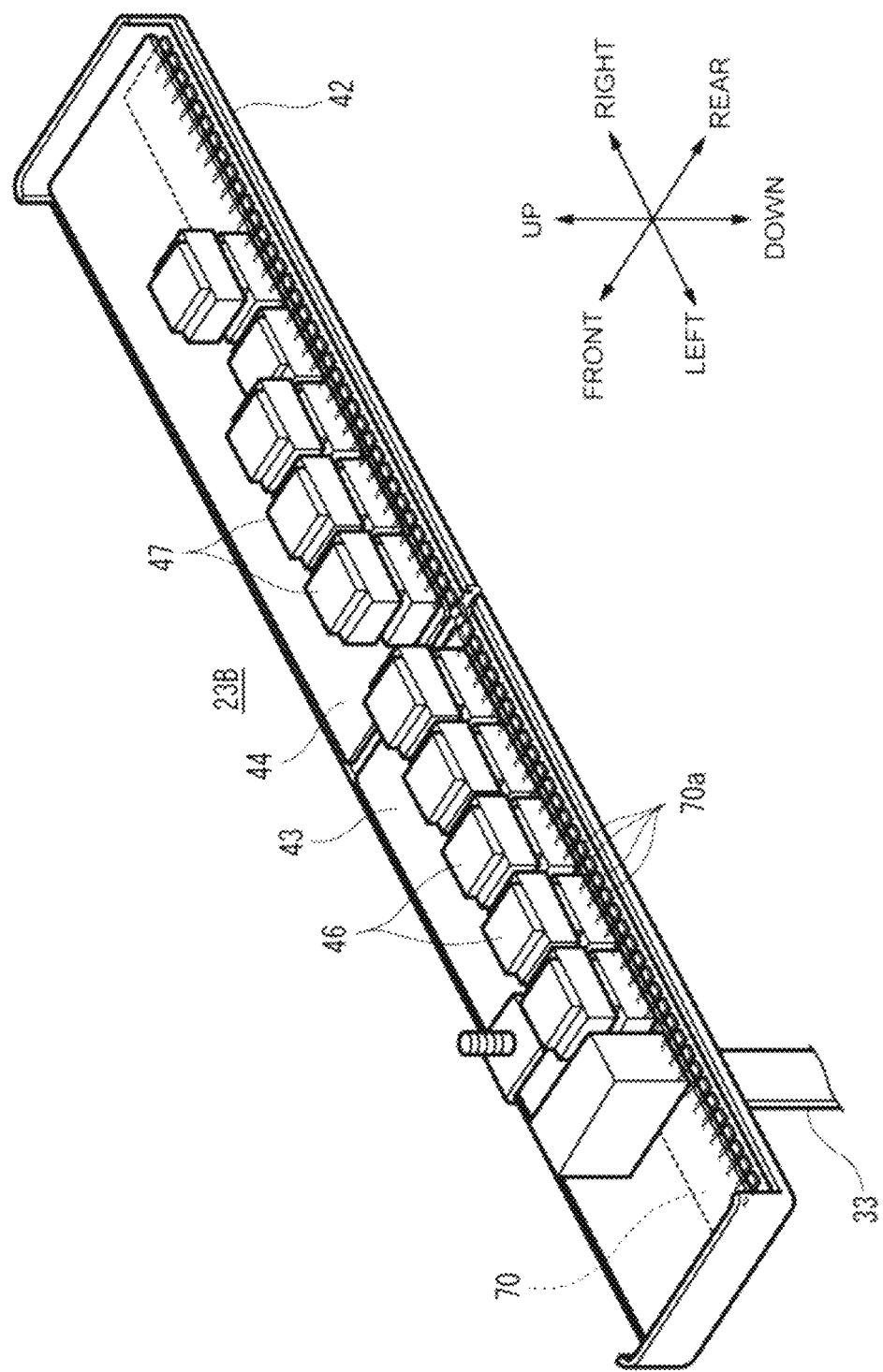
FIG. 10 is a perspective view showing a state in which an upper cover has been removed from the backbone JB structure body shown in FIG. 9.

External appearance of a backbone JB structure body 23B according to a modification is shown in FIG. 9. In addition, a state in which an upper cover has been removed from the backbone JB structure body 23B shown in FIG. 9 is shown in FIG. 10. In addition, a state in which a portion of the backbone JB structure body 23B of FIG. 10 has been enlarged is shown in FIG. 11.

Figure 11:
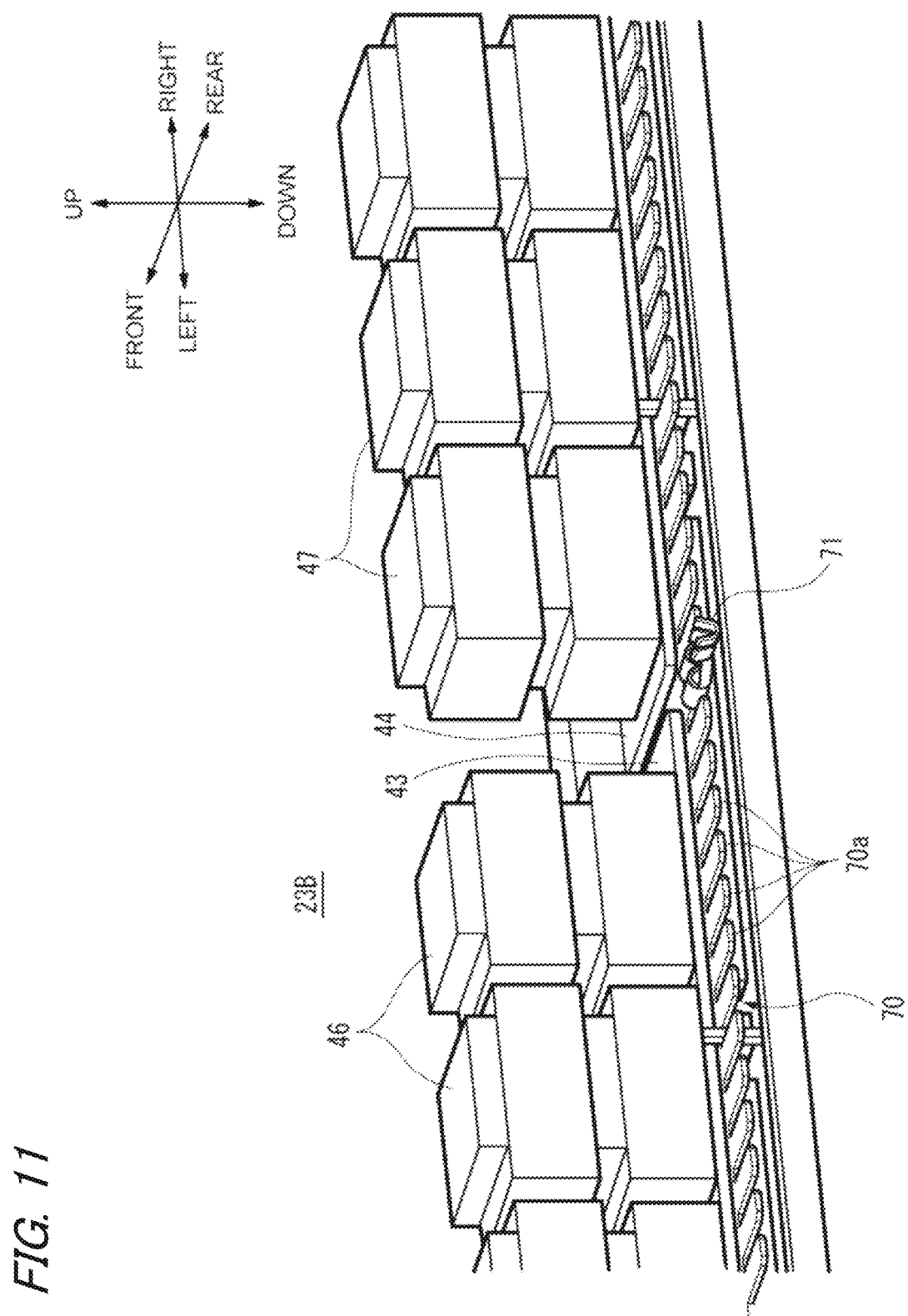
FIG. 11 is an enlarged view showing a portion of the backbone JB structure body of FIG. 10.

The backbone JB structure body 23B shown in FIGS. 9 to 11 is different from the aforementioned backbone JB structure body 23 in configuration for ground connection. That is, no ground connection terminal is provided in each branch line connection connector 46, 47 disposed on each printed circuit board 43, 44. Instead, a ground terminal busbar 70 provided with a large number of terminal connection protrusions 70a is provided inside a casing of the backbone JB structure body 23B.

The ground terminal busbar 70 is constituted by a thin plate made of metal with excellent electrical conductivity, such as aluminum or copper. The ground terminal busbar 70 extends like a belt long and narrow in a longitudinal direction of the casing of the backbone JB structure body 23B. In addition, the large number of terminal connection protrusions 70a are formed to be arranged side by side in one row at a place facing an opening portion on a front side (rear direction of a vehicle body) of the casing of the backbone JB structure body 23B. All the large number of terminal connection protrusions 70a have the same shape and the same dimensions and are disposed regularly at fixed intervals.

As shown in FIG. 11, a ground terminal 71 having a predetermined shape can be mounted on each of the large number of terminal connection protrusions 70a. When each branch line sub harness 51 shown in FIG. 4 is connected to the branch line connection connector 46 or 47 of the backbone JB structure body 23B, a ground line included in the branch line sub harness 51 is separated from a connector of the branch line sub harness 51 and led out as a separate ground line from the connector, and the ground terminal 71 shown in FIG. 11 is mounted on a front end of the ground line. The ground terminal 71 mounted on the ground line of the branch line sub harness 51 is mounted on one of the large number of terminal connection protrusions 70a.

The ground terminal busbar 70 shown in FIGS. 9 to 11 is fixed in a state in which the ground terminal busbar 70 is put between an inner-side bottom surface of a lower cover 42 and the printed circuit boards 43 and 44 located above the inner-side bottom surface of the lower cover 42. In addition, the ground terminal busbar 70 is electrically connected to ground circuit patterns on the printed circuit boards 43 and 44.

Assume that the backbone JB structure body 23B shown in FIGS. 9 to 11 is used. When performing ground connection of each of various electrical components in this case, a worker or a user can select one from the large number of terminal connection protrusions 70a desirably.

In addition, the circuit routing system for the vehicle may be configured to be provided with a background-art wire harness in addition to the aforementioned configuration. In this case, it is, for example, preferable that a portion of a configuration common to respective vehicles or grades is designed to be materialized by the background-art wire harness in order not to increase a variation of wire harnesses.

Figure 12:
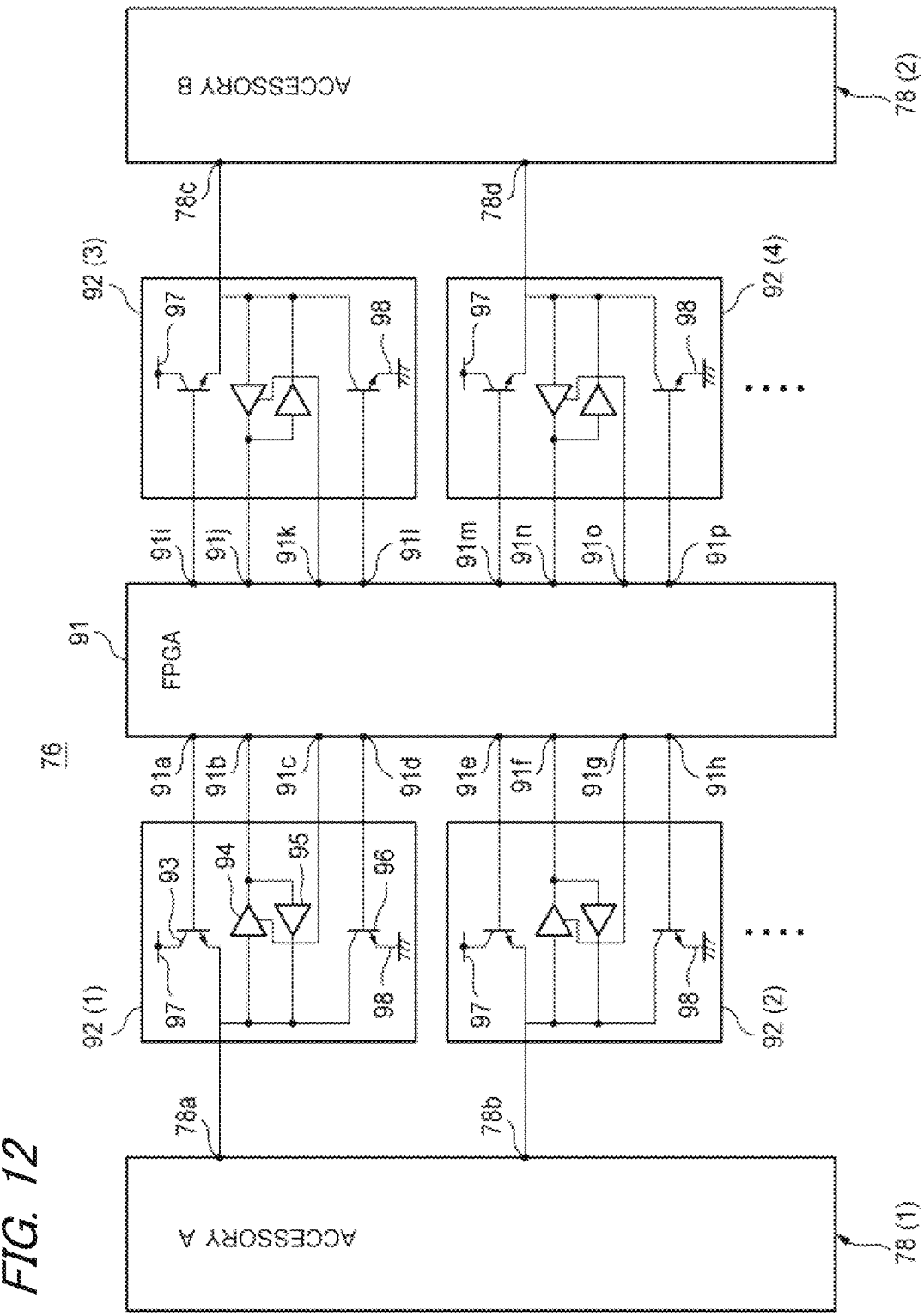
FIG. 12 is a block diagram showing a configuration example of a changeover circuit of the backbone JB structure body.

In addition, the backbone JB structure body 23 may be provided with a changeover circuit 76 as shown in FIG. 12, by way of example. For example, the changeover circuit 76 has a function of changing over from a connection state of a wiring of each accessory with one of a power supply busbar, a ground busbar and a communication cable to a connection state of the wiring of the accessory with another of them.

In the example shown in FIG. 12, a case in which an accessory 78(1) has two terminals 78a and 78b and an accessory 78(2) has two terminals 78c and 78d is assumed in order to make it easy to understand. The number of terminals of each of the accessories 78 may increase in accordance with necessity. When, for example, the accessory 78 has a power supply terminal, a ground terminal, and two communication line terminals, the total number of the terminals is four. When the number of the terminals of the accessory 78 increases, the number of circuit modules 92 included in the changeover circuit 76 also increases. That is, the independent circuit modules 92 are connected to the terminals of the accessory 78 respectively.

Each of the circuit modules 92(1) to 92(4) shown in FIG. 12 is provided with two switching transistors 93 and 96, and two level shift circuits 94 and 95. For example, in the transistor 93 inside the circuit module 92(1), a base terminal is connected to an output port 91a of an FPGA device 91, a collector terminal is connected to a power supply line 97, and an emitter terminal is connected to the terminal 78a of the accessory 78(1). Accordingly, as long as a signal level of the output port 91a can be controlled to thereby control ON/OFF of the transistor 93, it is possible to change over whether to connect the terminal 78a to the power supply line 97 or not.

In addition, in the transistor 96 inside the circuit module 92(1), a base terminal is connected to an output port 91d of the FPGA device 91, a collector terminal is connected to the terminal 78a of the accessory 78(1), and an emitter terminal is connected to a ground line 98. Accordingly, as long as a signal level of the output port 91d can be controlled to thereby control ON/OFF of the transistor 96, it is possible to change over whether to connect the terminal 78a to the ground line 98 or not.

In addition, when the terminal 78a of the accessory 78(1) serves as a bidirectional communication terminal, the FPGA device 91 performs control to turn OFF the transistors 93 and 96, and then changes over the level shift circuits 94 and 95 to an active state. Thus, the terminal 78a can be used as a communication line to be connected to another communication line. In addition, in this case, for example, a communication line of the accessory 78(2) and the communication line of the accessory 78(1) can be also connected to each other via an internal circuit of the FPGA device 91.

In this manner, the FPGA device 91 controls the circuit module 92(1) suitably. Accordingly, even when the terminal 78a of the accessory 78(1) serves as any of the power supply input terminal, the ground terminal and the communication terminal, a required connection state can be secured. That is, distribution of the power or the communication circuit can be changed flexibly in accordance with each branch line sub harness to be connected.

In addition, at least a portion of a fuse group 64 may be placed inside some of the branch line connection connectors 46.

As described above, the circuit routing system for the vehicle according to the embodiment of the present invention has a structure like a backbone as a whole, and particularly the shape or structure of the backbone trunk line portion 30 is extremely simplified. Even when the number of electrical components increases or a new electrical component is added afterwards, the electrical component can be connected to a suitably-located one of the branch line connection connectors 46 and 47 of the backbone JB structure bodies 21 to 25 by use of a branch line sub harness 51 without changing the configuration of the backbone trunk line portion 30 or each of the backbone JB structure bodies 21 to 25.

Here, the aforementioned characteristics of the embodiment of the circuit for the vehicle and the circuit routing system for the vehicle according to the present invention will be summarized and listed briefly in the following configurations [1] to [6] respectively.

[1] A circuit (backbone JB structure body 23) for a vehicle, that is placed on the vehicle, the circuit including:
a power supply circuit (printed circuit board 43, 44) that is connected to a main power supply (on-vehicle battery 60) on the vehicle;
a plurality of connection portions (branch line connection connectors 46, 47) to which a plurality of branch lines (branch line sub harnesses 51) having power supply lines are connected respectively; and
a control portion (control unit 48) that controls distribution of power from the power supply circuit to the plurality of branch lines.

[2] A circuit for a vehicle according to the aforementioned configuration [1], wherein:
each of the branch lines includes a communication line (51c); and
the circuit for the vehicle further includes:
a communication circuit (see FIG. 7) that connects, of the branch lines connected to the connection portions, the communication lines to one another in a communicable state.

[3] A circuit for a vehicle according to the aforementioned configuration [1], further including:
a plurality of fuses (fuse group 64) that can cut off feeding of power from the power supply circuit to the plurality of branch lines respectively.

[4] A circuit for a vehicle according to the aforementioned configuration [1], further including:
a trunk line connection portion (49) that serves for connecting a belt-like trunk line (backbone trunk line portion 30) connected to the main power supply to the power supply circuit.

[5] A circuit for a vehicle according to the aforementioned configuration [1], further including:
a ground busbar (ground terminal busbar 70) in which a plurality of protrusion portions (terminal connection protrusions 70a) to which predetermined ground terminals (71a) can be connected are formed at fixed intervals along a direction in which the plurality of connection portions are arranged side by side.

[6] A circuit routing system (see FIG. 1) for a vehicle including:
a plurality of circuits (backbone JB structure bodies 21 to 25) for the vehicle according to any one of the aforementioned configurations [1] to [5]; wherein:
the plurality of circuits for the vehicle are connected to one another through a shared trunk line (backbone trunk line portion 30).

Although the present invention has been described in detail with reference to a specific embodiment, it is obvious to those skilled in the art that various changes or modifications can be made without departing from the spirit and scope of the present invention.

What is claimed is:

1. A circuit for a vehicle, that is placed on the vehicle, the circuit including:
a power supply circuit that is connected to a main power supply on the vehicle;
a plurality of connection portions to which a plurality of branch lines, having power supply lines and communication lines, are connected respectively; and
a control portion that controls distribution of power from the power supply circuit to the plurality of branch lines,
wherein each of the branch lines comprises one of a plurality of wire harnesses each having at least one of the power supply lines and at least one of the communication lines respectively therein,
wherein the control portion and the plurality of connection portions are arranged on a circuit board,
wherein the wire harnesses are arranged as directly connecting to respective ones of the connection portions and as adjacent to each other along a length of the circuit board and at a first side of the circuit board, and
wherein the power supply circuit is formed on the circuit board.

2. A circuit for a vehicle according to claim 1, wherein:
the circuit for the vehicle further includes:

a communication circuit that connects, of the branch lines connected to the connection portions, the communication lines to one another in a communicable state.

3. A circuit for a vehicle according to claim 1, further including:
a plurality of fuses that can cut off feeding of power from the power supply circuit to the plurality of branch lines respectively.

4. A circuit for a vehicle according to claim 1, further including:
a trunk line connection portion that serves for connecting a belt-like trunk line connected to the main power supply to the power supply circuit.

5. A circuit for a vehicle according to claim 1, further including:
a ground busbar in which a plurality of protrusion portions to which predetermined ground terminals can be connected are formed at fixed intervals along a direction in which the plurality of connection portions are arranged side by side.

6. A circuit routing system for a vehicle, including:
a plurality of circuits for the vehicle according to claim 1; wherein:
the plurality of circuits for the vehicle are connected to one another through a shared trunk line.

* * * * *